United States Patent
Magee

(10) Patent No.: US 8,676,872 B2
(45) Date of Patent: Mar. 18, 2014

(54) RECURSIVE TAYLOR SERIES-BASED COMPUTATION OF NUMERICAL VALUES FOR MATHEMATICAL FUNCTIONS

(75) Inventor: David Patrick Magee, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 505 days.

(21) Appl. No.: 13/029,887

(22) Filed: Feb. 17, 2011

(65) Prior Publication Data

US 2011/0219053 A1   Sep. 8, 2011

Related U.S. Application Data

(60) Provisional application No. 61/311,017, filed on Mar. 5, 2010.

(51) Int. Cl.
*G06F 1/02* (2006.01)

(52) U.S. Cl.
USPC .......................................................... 708/270

(58) Field of Classification Search
None
See application file for complete search history.

(56) References Cited

U.S. PATENT DOCUMENTS

| | | | |
|---|---|---|---|
| 6,711,596 B1 * | 3/2004 | Coleman | 708/277 |
| 7,454,450 B2 | 11/2008 | Remy et al. | |
| 7,984,091 B1 * | 7/2011 | Szedo | 708/276 |
| 2008/0005212 A1 * | 1/2008 | Levien | 708/275 |
| 2010/0040382 A1 * | 2/2010 | Romagnoli et al. | 398/187 |
| 2011/0219053 A1 * | 9/2011 | Magee | 708/270 |

* cited by examiner

*Primary Examiner* — David H Malzahn
(74) *Attorney, Agent, or Firm* — Steven A. Shaw; Wade James Brady, III; Frederick J. Telecky, Jr.

(57) ABSTRACT

A recursive method for computing numerical values for mathematical functions includes providing a recursive Taylor series representation of a mathematical function f(x) of a variable x evaluated around a given operating point a. The recursive Taylor series representation includes a plurality of derivative derived terms that include ratios of derivatives of f(x) evaluated at the operating point a. Coefficient data is determined from ones of the derivative derived terms stored in a tangible memory device evaluated at the operating point a over a predetermined range. An approximation for the mathematical function f(x) is computed using the recursive Taylor series representation evaluated with the coefficient data.

11 Claims, 5 Drawing Sheets

```
;*----------------------------------------------------------------*
;*    SOFTWARE PIPELINE INFORMATION
;*
;*       Loop source line                 : 229
;*       Loop opening brace source line   : 230
;*       Loop closing brace source line   : 353
;*       Loop Unroll Multiple             : 2x
;*       Known Minimum Trip Count         : 1
;*       Known Max Trip Count Factor      : 1
;*       Loop Carried Dependency Bound(^) : 8
;*       Unpartitioned Resource Bound     : 17
;*       Partitioned Resource Bound(*)    : 17
;*       Resource Partition:
;*                                A-side   B-side
;*       .L units                    4       4
;*       .S units                   16      17*
;*       .D units                    8       4
;*       .M units                    6       6
;*       .X cross paths             14       0
;*       .T address paths            6       6
;*       Long read paths             0       0
;*       Long write paths            0       0
;*       Logical ops (.LS)           7       1     (.L or .S unit)
;*       Addition ops (.LSD)        15      20     (.L or .S or .D unit)
;*       Bound(.L .S .LS)           14      11
;*       Bound(.L .S .D .LS .LSD)   17*     16
;*
;*       Searching for software pipeline schedule at ...
;*          ii = 17 Schedule found with 4 iterations in parallel
```

*FIG. 5*

```
;*-----------------------------------------------------------------
*
;*   SOFTWARE PIPELINE INFORMATION
;*
;*       Loop source line              : 46
;*       Loop opening brace source line : 47
;*       Loop closing brace source line : 170
;*       Loop Unroll Multiple          : 2x
;*       Known Minimum Trip Count      : 1
;*       Known Max Trip Count Factor   : 1
;*       Loop Carried Dependency Bound(^) : 8
;*       Unpartitioned Resource Bound  : 17
;*       Partitioned Resource Bound(*) : 17
;*       Resource Partition:
;*                         A-side   B-side
;*       .L units            4        4
;*       .S units           16       17*
;*       .D units            8        4
;*       .M units            8        8
;*       .X cross paths     14        0
;*       .T address paths    6        6
;*       Long read paths     0        0
;*       Long write paths    0        0
;*       Logical ops (.LS)   7        1     (.L or .S unit)
;*       Addition ops (.LSD) 15      20     (.L or .S or .D unit)
;*       Bound(.L .S .LS)   14       11
;*       Bound(.L .S .D .LS .LSD)  17*   16
;*
;*       Searching for software pipeline schedule at ...
;*          ii = 17 Schedule found with 4 iterations in parallel
```

*FIG. 6*

RECURSIVE TAYLOR SERIES-BASED COMPUTATION OF NUMERICAL VALUES FOR MATHEMATICAL FUNCTIONS

CROSS REFERENCE TO RELATED APPLICATIONS

This application claims the benefit of Provisional Application Ser. No. 61/311,017 entitled "A MULTIPLIER EFFICIENT METHOD FOR COMPUTING SQUARE ROOT AND MAGNITUDE VALUES", filed Mar. 5, 2010, which is herein incorporated by reference in its entirety.

FIELD

Disclosed embodiments relate to recursive computation of numerical values for mathematical functions and computation devices including integrated circuits (ICs) that implement such computations.

BACKGROUND

As electronic signal processing systems become more complex, engineers are continually faced with tradeoffs between performance, power and area (PPA) when implementing the numerical algorithms needed for a given system implementation. In many of these systems (e.g., communication systems, imaging systems, control systems, etc.), there is generally a need for more numerically efficient algorithms for computing mathematical values. If a given design involves fewer computations than another design to achieve the same numerical performance (e.g., accuracy), then such a design will require less area and power to produce the same desired numerical value. As a result, a design sensitive to PPA is better than another design from a system design perspective.

A variety of methods are known for computing mathematical functions such as magnitude and square root. For example, the cordic algorithm provides an iterative approach using a divide by two architecture. While the cordic algorithm can achieve N bits of precision in N iterations, the cordic algorithm is best suited for implementations that do not contain a multiplier.

Another approach to approximate the numerical value of mathematical functions is Newton-Raphson. The general mathematical representation of the Newton-Raphson approach for a mathematical function f(x) of a variable x is given by the following equation:

$$x_{n+1} = x_n - \frac{g(x_n)}{g'(x_n)} \quad (1)$$

where g(x)=f(x)+b. For the Newton-Raphson approach, the derivative of the function f(x) must exist and have a finite value throughout the region of interest. Otherwise, the iterative approach will diverge from the desired result. The convergence of the Newton-Raphson method is quadratic in nature. That is, the number of accurate bits in the computation result roughly doubles for each iteration of the algorithm, assuming that the initial guess, $x_0$, is close to the actual numerical result.

Another approach to approximate the numerical value of mathematical functions is the Taylor series. In mathematics, the Taylor series is known to be a representation of a function f(x) as an infinite sum of terms calculated from the values of its derivatives evaluated at a particular single point/value generally represented by an operating point a. The general mathematical representation of a Taylor series approximation for the numerical value of f(x) near an operating point a is given by the following equation:

$$f(x) \approx \sum_{n=0}^{\infty} \frac{f^{(n)}(a)}{n!}(x-a)^n \quad (2)$$

where $f^{(n)}(a)$ denotes the $n^{th}$ derivative of the function f(x) evaluated at the operating point a. In a practical application, the infinite sum in (2) is replaced with a finite sum of N terms as given by the following equation:

$$f(x) \approx \sum_{n=0}^{N-1} \frac{f^{(n)}(a)}{n!}(x-a)^n \quad (3)$$

The accuracy of the numerical result can be determined directly from the number of terms N in the Taylor series approximation. That is, the bound for the error (e) can be written as:

$$e = |f(x) - \hat{f}(x)| \leq \frac{f^{(N)}}{N!}(x-a)^N \quad (4)$$

for an N term approximation. As a result, the number of terms needed for a given direct Taylor series design implementation will be determined by the numerical accuracy requirements of the system implementation. For reference, a conventional direct Taylor series implementation requires $N*(N-1)/2$ multiplications for an N term approximation.

SUMMARY

Disclosed embodiments provide recursive Taylor series-based methods for computing numerical values for mathematical functions that are much more computationally efficient compared to existing computation methods for the case when the computational architecture involves multipliers. A recursive method for computing numerical values for mathematical functions includes providing a recursive Taylor series representation of a mathematical function f(x) of a variable x evaluated around a given operating point a. The recursive Taylor series representation includes a plurality of derivative derived terms that include ratios of derivatives of f(x) at the operating point a. Coefficient data is determined from ones of the derivative derived terms stored in a tangible memory device evaluated at the operating point a over a predetermined range. An approximation for the mathematical function f(x) is computed using the recursive Taylor series representation evaluated with the coefficient data. Digital signal processor (DSP) integrated circuits (ICs) for computing numerical values for mathematical functions using disclosed recursive Taylor series-based algorithms are also disclosed.

BRIEF DESCRIPTION OF THE DRAWINGS

FIG. 5 is a listing of software pipeline information that can be run on the C6474 DSP chip for implementing an example square root function, according to an example embodiment.

FIG. 6 is a listing of software pipeline information that can be run on the C6474 DSP chip for implementing an example magnitude function for complex data values, according to an example embodiment.

DETAILED DESCRIPTION

Figure 1:
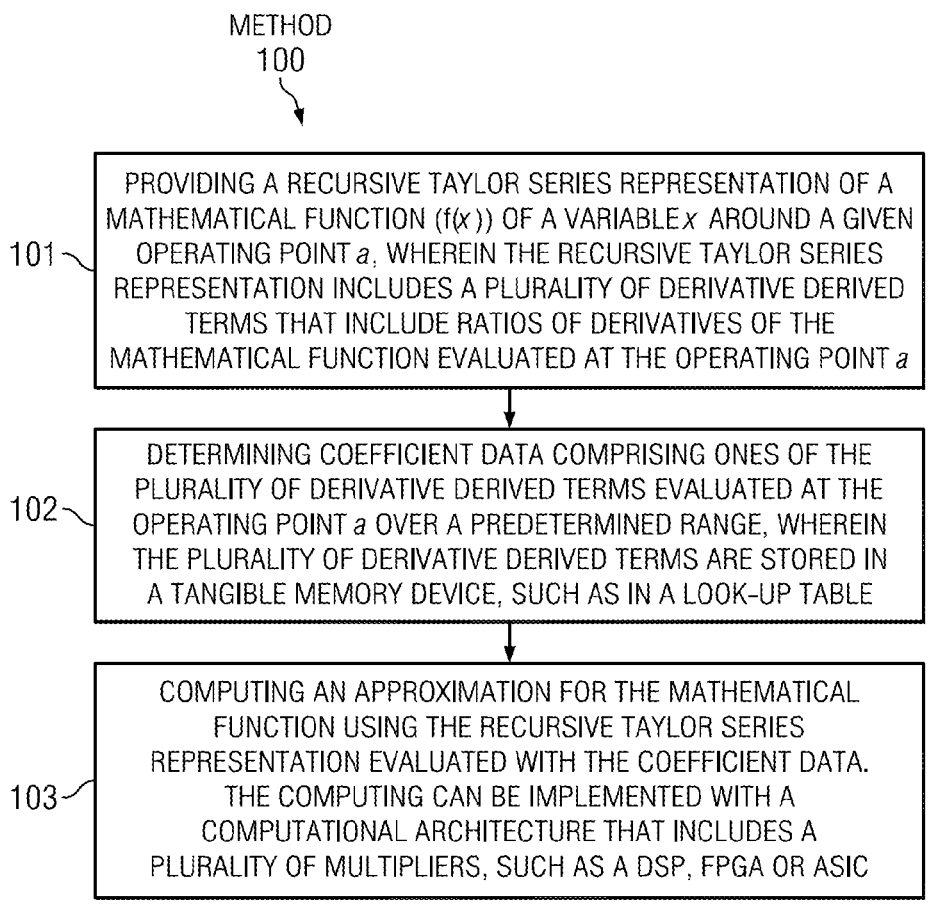
FIG. 1 is a flow chart for a recursive Taylor series-based method for computing numerical values for mathematical functions, according to an example embodiment.

Example embodiments are described with reference to the drawings, wherein like reference numerals are used to designate similar or equivalent elements. Illustrated ordering of acts or events should not be considered as limiting, as some acts or events may occur in different order and/or concurrently with other acts or events. Furthermore, some illustrated acts or events may not be required to implement a methodology in accordance with this disclosure.

As described above, a problem with the conventional direct implementation of the Taylor series approximation (equation 3) is that the multiplier count needed is too high for many applications, which results in the design requiring too large an area, and as a result, too much power to produce the desired numerical accuracy. For many transcendental functions and all algebraic functions, disclosed embodiments recognize that the Taylor series approximation for a mathematical function $f(x)$ of a variable x around an operating point a can be represented as a recursive equation in the following form:

$$f(x) \approx d_{N-1}(1+d_{N-2}(1+d_{N-3}(1+d_{N-4}(1+\ldots+d_1(1+d_0))))) \quad (5)$$

where $$d_i = \begin{cases} \frac{1}{N-i-1}\left(\frac{f^{(N-i-1)}(a)}{f^{(N-i-2)}(a)}\right)(x-a) & \text{for } 0 \leq i \leq N-2 \\ f(a) & \text{for } i = N-1 \end{cases} \quad (6)$$

For the recursive equation given by equation 5 above, there is a starting value $d_0$ based on the derivatives of $f(x)$ evaluated at a. Each new term is generated by adding one and then multiplying by $d_i$. The following iterative form can be realized for a N term approximation:

$$y_0 = d_0$$
$$y_1 = d_1(1+y_0)$$
$$y_2 = d_2(1+y_1)$$
$$\vdots$$
$$y_{N-2} = d_{N-2}(1+y_{n-3})$$
$$y_{N-1} = d_{N-1}(1+y_{n-2})$$

It is noted that this implementation requires only $2*(N-1)$ multiplications for an N term approximation for the numerical value of the mathematical function $f(x)$ around a. Accordingly, the architecture to implement this recursive Taylor series algorithm representation (5, 6) provides a significant reduction in the number of multipliers as compared to the direct Taylor series implementation for the same number of terms (N) in the approximation. For example, for a 10 (N=10) term approximation, the number of multiplications using known equation (3) for the direct Taylor series implementation is 45 (calculated from $N*(N-1)/2$), while the disclosed Taylor series algorithm representation (5, 6) is much more computationally efficient as it reduces the number of multiplications to 18 (calculated from $2*(N-1)$). The above-described recursive design is the foundation for disclosed algorithms that can be used to compute mathematical values for various functions, such as the magnitude of complex data values and the value of square roots around a given operating point a.

To improve the convergence properties of the design, that is the ability of the method to converge to the desired level of accuracy in the fewest number of iterations, lookup tables (e.g., stored in non-volatile memory) can be used to store the $f^{(i)}(a)/f^{(i+1)}(a)$ (the "derivative derived terms") in equation (6) for values of operating point a over a range of a values of interest. In general, the range of interest depends upon the particular function $f(x)$ for which the approximation is being made. In general, the range of interest is determined by dividing the range of values x into a finite number of regions, each region denoted by its operation point a. In one embodiment, the recursive Taylor series algorithm (5, 6) can be used to generate another algorithm to approximate the mathematical value of a square root function. Disclosed approximation algorithms for a square root function using 5, 6 can include from two (2; N=2) terms to tens of terms (e.g., N=20), generally 2 to 8 terms, depending on the desired level of accuracy.

Consider an example four (4) term (N=4) approximation for the square root function as given by the algorithm (7) shown below. Disclosed embodiments recognize that algorithm 7 can be generated by simplifying the recursive Taylor series algorithm (5, 6) for certain functions (i.e., using (6) generates $d_3 = a^{1/2}$, $d_2 = \frac{1}{2}(a^{-1})(x-a)$ since the derivative with respect to x of $x^{1/2}$ is $\frac{1}{2}x^{-1/2}$ and $\frac{1}{2}^{-1/2}/x^{1/2} = \frac{1}{2}(x^{-1})$, $d_1 = -\frac{1}{4}(a^{-1})(x-a)$, and $d_0 = -\frac{1}{2}(a^{-1})(x-a)$):

$$f(x) = \sqrt{x} \approx a^{1/2}\left(1 + \frac{1}{2}a^{-1}(x-a)\left(1 - \frac{1}{4}a^{-1}(x-a)\left(1 - \frac{1}{2}a^{-1}(x-a)\right)\right)\right) \quad (7)$$

It is noted that approximation algorithm (7) for computing the square root of a function includes only $a^{1/2}$ and $a^{-1}$ powers (thus only 2 different powers) for the derivative derived terms. This low number of different powers for the derivative derived terms with respect to the number of terms (N) in the approximation algorithm enables significant computational and memory access efficiency. For example, not as many multiplications are needed to compute the coefficients since there are really only two unique coefficients in Equation (7), namely $a^{1/2}$ and $a^{-1}$.

Since the number of unique coefficients is only two, they can be stored in registers such as DSP registers in the case of a DSP implementation, which reduces the memory access bandwidth needed to load coefficients from memory. It is expected that functions besides the square root may also provide a reduced number of actual coefficients with respect to the number of terms (N) in the approximation algorithm due to the mathematical simplifications produced by the ratio of derivative terms to thus provide analogous computational efficiency.

Tables, such as stored in suitable tangible memory (e.g., a non-volatile memory), can be used to store the $a^{1/2}$ and $a^{-1/2}$ values for the derivative derived terms for implementing approximation algorithm (7). Notice that $a^{1/2}$ and $a^{-1/2}$ values can be stored since they are the fundamental values needed in Equation (7) after the $a^{1/2}$ term is distributed through the equation. Also note that $a^{-1}=a^{-1/2}*a^{-1/2}$.

One design question becomes how many values should be in the a table and how should the table values in the table be referenced. For a new and computationally efficient answer to this design question, disclosed embodiments include partitioning an argument of the derivative derived terms comprising the operating point a to divide the x value into at least two (2) portions. Consider the following partitioned representation for an x value:

$$x = x_H \cdot 2^{2L} + x_L \tag{8}$$

where $x_L$, is the lower portion of the x value and $x_H$ is the higher portion of the x value. It is noted that the lower portion $x_L$, occupies the lower 2*L bits of the x value. Using the x value partitioning shown in Equation (8), the operating point (i.e. the a value) can be written as:

$$a = x_H \cdot 2^{2L} \tag{9}$$

It can be seen that that the $2^{2L}$ term in (9) is just a power of 2 scaling and thus can be left out of the table (e.g., a look-up table) since L is a known integer value (i.e. it can be determined from the x value and the number of values in the table). Thus, the table values for the square root function for storing $a^{1/2}$ and $a^{-1/2}$ values can contain values that only represent $\sqrt{x_H}$ and $1/\sqrt{x_H}$. For example, if the x value occupies M bits, then the table should contain $2^{M-2L}$ values to cover the entire range of possible $x_H$ values. In one particular embodiment, for 32 bit data (i.e. M=32) and a value of L=12, the table contains $2^{32-24}=2^8=256$ values to cover the entire range of possible $x_H$ values.

The bit representation of the x value given in Equation (8) is new and beneficial for disclosed designs because it forces the lower portion of the x value $x_L$ to be an even number of bits. The lower portion $x_L$ being an even number of bits makes the square root of Equation (9) be an exact power of two (e.g. $\sqrt{x_H} \cdot 2^L$), which improves the implementation efficiency in computational devices that use base 2 arithmetic for computations, such as digital signal processors (DSPs), field programmable gate arrays (FPGAs), and application specific integrated circuits (ASICs). Otherwise, an offset term would be added to the result for situations when the number of bits in the lower portion $x_L$ is odd.

The square root function shown in approximation algorithm (7) or a variant thereof (i.e., different number of M terms) can also be used to compute other functions, such as the magnitude of complex data values in the following manner. A complex data value y can be written as a real portion and an imaginary portion as follows:

$$y = y_r + j \cdot y_i \tag{10}$$

where $y_r$ is the real portion of the complex data value, $y_i$ is the imaginary portion of the complex data value, and $j=\sqrt{-1}$. To compute the magnitude of a complex data value y, the following value of x can be used in the square root approximation algorithm (7) disclosed above since the square root of a squared function is the function itself:

$$x = y_r^2 + y_i^2 \tag{11}$$

Thus, the disclosed square root approximation algorithm (7) can also be used to compute the magnitude of complex data values as well.

FIG. 1 is a flow chart for a recursive method 100 for computing values for mathematical functions, according to an example embodiment. Step 101 comprises providing a recursive Taylor series representation of a mathematical function (f(x)) of a variable x around a given operating point a, wherein the recursive Taylor series representation includes a plurality of derivative derived terms that include ratios of derivatives of the mathematical function evaluated at the operating point a. The mathematical function f(x) can be a square root in one embodiment, or magnitude function $x=y_r^2+y_i^2$ where y is a complex data value in another embodiment.

Step 102 comprises determining coefficient data comprising ones of the plurality of derivative derived terms evaluated at the operating point a over a predetermined range, wherein the plurality of derivative derived terms are stored in a tangible memory device (e.g., ROM), such as in a look-up table.

In step 103 an approximation is computed for the mathematical function using the recursive Taylor series representation evaluated with the coefficient data. The computing can be implemented with a computational architecture that includes a plurality of multipliers, such as a DSP, FPGA or ASIC.

As described above, the method can further comprise partitioning an argument of the derivative derived terms comprising the operating point a to divide the x value into at least a lower bit portion $x_L$, and a higher bit portion $x_H$, so that $a=x_H \cdot 2^{2L}$, wherein the lower bit portions $2^{2L}$ have an even number of bits, and wherein the plurality of derivative derived terms are stored in a table in the tangible memory device with only their higher bit portions $x_H$.

Figure 2:
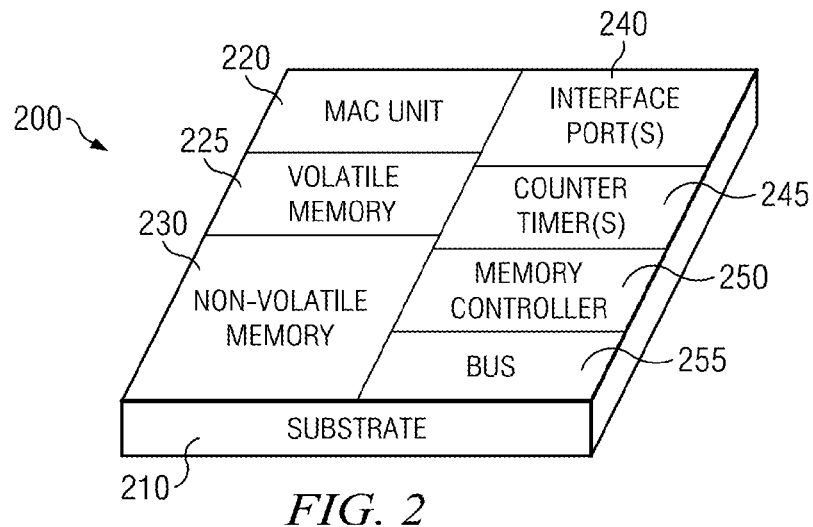
FIG. 2 is a simplified block diagram of a DSP IC that a implements a recursive Taylor series-based method for computing numerical values for mathematical functions, according to an example embodiment.

FIG. 2 is a simplified block diagram of a DSP IC (chip) 200 that employs a recursive Taylor series representation for computing values for mathematical functions, according to an example embodiment. DSP IC 200 is shown formed on a substrate 210 having a semiconductor top surface (e.g., a silicon substrate) and comprises a volatile memory (e.g., random access memory (RAM)) 225 and a non-volatile memory (e.g., read only memory (ROM)) 230. Disclosed algorithms and the plurality of derivative derived terms that are a function of a can be stored in non-volatile memory 230.

The DSP IC 200 is also shown including interface port(s) 240 for inputs and outputs, counter/timers 245, memory controller 250 and bus 255. DSP IC 200 includes a multiply-accumulate (MAC) unit 220 comprising a plurality of multipliers that is operable to compute a value for a mathematical function f(x) using the recursive Taylor series representation evaluated with coefficient data comprising ones of the plurality of derivative derived terms evaluated the operating point a over a predetermined range.

For example, DSP IC 200 can implement approximation algorithm 7 that represents a square root function f(x) as a recursive Taylor series around a given operating point a, generate coefficient data comprising ones of the plurality of derivative derived terms evaluated the operating point a over a predetermined range, where the respective derivative derived terms can be stored in the non-volatile memory 230 with only their higher bit portions based on the partitioning an argument of the derivative derived terms comprising the operating point a described above.

As with conventional DSPs, DSP IC 200 can execute instructions to implement one or more digital signal processing algorithms or processes. For instance, the instructions data can include various coefficients and instructions that, when loaded and initialized into DSP IC 200, can prompt the DSP IC 200 to implement different computations for different functions. For example, DSP IC 200 can receive the derivative derived terms stored as a look-up table in non-volatile memory 230, and determine coefficient data comprising ones of the plurality of derivative derived terms evaluated at the operating point a over a predetermined range in memory, where the processor can determine the table data to retrieve based on the $x_h$ value. Approximation algorithm 7 can then be applied using the coefficient data to compute a mathematical value for the function in real-time.

Figure 3:
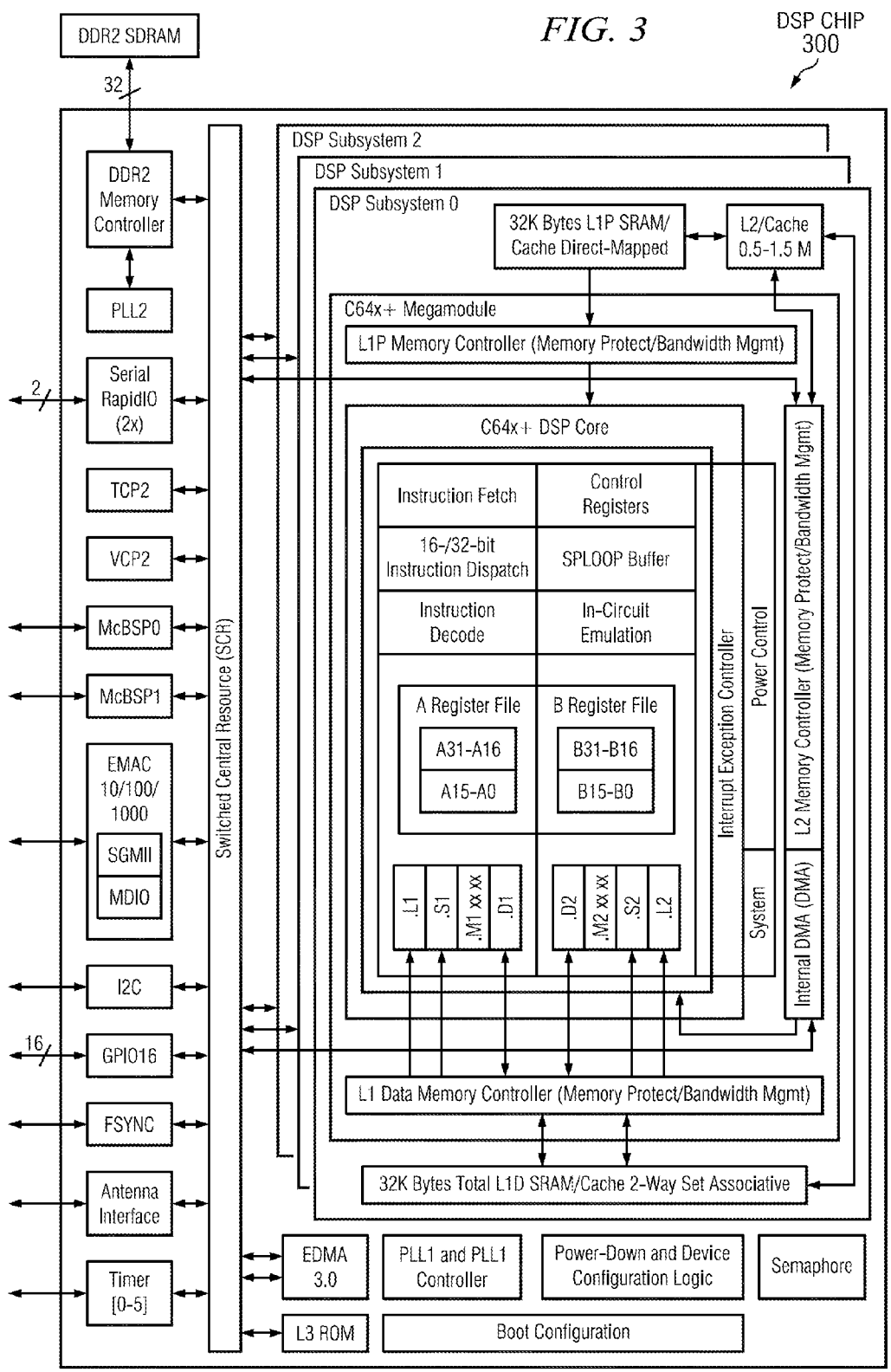
FIG. 3 is a functional block diagram of an example overall C6474 DSP multicore chip from Texas Instruments Incorporated (Dallas, Tex.).

The performance of disclosed embodiments was tested based on an implementation of the square root algorithm (approximation algorithm (7)) realized in software targeted for the Texas Instruments (TI) DSP C6474 architecture as compared to existing software implementations. FIG. 3 is a block diagram of an example overall C6474 DSP chip 300 from Texas Instruments Incorporated (Dallas, Tex.) that was used for the testing. The C6474 DSP chip 300 includes eight functional units that reside in two data paths (A and B) as shown in the block diagram of the arch for a given core in FIG. 4. Each data path contains four functional units (L, S, M, and D) and 32, 32-bit general-purpose registers. More details about the architecture, instructions and mapping of instructions to functional units can be found in TMS320C64x/C64x+ DSP CPU and Instruction Set Reference Guide, Texas Instruments, Literature Number: SPRU732G, February 2008. Unless otherwise noted, every unit produces a result at each clock cycle when pipelined perfectly.

Figure 4:
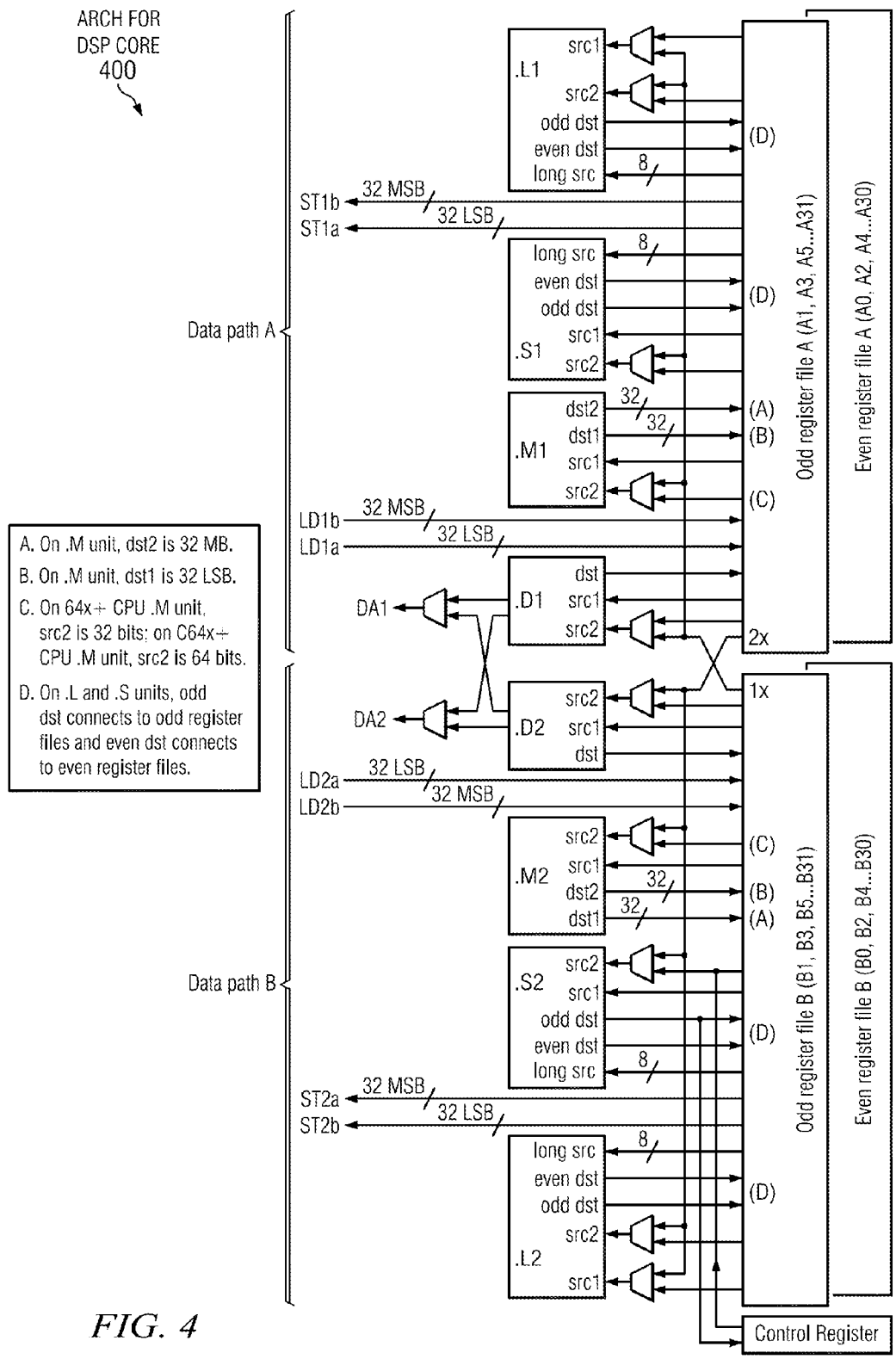
FIG. 4 is a block diagram of the architecture for a given C64+ DSP core in the C6474 chip shown in FIG. 3 showing data paths.

FIG. 4 is a block diagram of the arch for a given C64+ DSP core 400 in the C6474 chip 300 of FIG. 3 showing data paths. The DSP core 400 can be seen to include a plurality of separate redundant data paths for computing the approximation for f(x), shown as data path A and data path B. The data paths are not completely orthogonal. Cross paths between A and B side registers are also present for improved data throughput efficiency.

FIG. 5 is a listing of software pipeline information for a implementing an example square root function. The cycle count requirements for the four functional units on the data path A and B sides are provided as well as loop dependency information. The disclosed design for determining the square root of a function using approximation algorithm (7) along with bit partitioning based on (9) was found to take 8.25 cycles to compute each square root value, since it takes 17 total cycles and the DSP chip had a loop unrolling factor of 2. It is noted that this architecture is not multiplier limited (M unit), but is instead shift limited (S unit) using a disclosed design.

FIG. 6 is a listing of software pipeline information for implementing an example magnitude function for complex data values. The cycle count requirements for the four functional units on the A and B sides are provided as well as loop dependency information. Since the square root implementation used for the magnitude function was not multiplier limited, the architecture for the magnitude computation was found to take just 8.25 cycles per value as well.

The previous approach running on the C64+ DSP architecture for computing the square root and magnitude of complex data values, which was based on a Newton-Raphson approach, took 11.1 cycles per value and 12.6 cycles per value, respectively. The results using a disclosed square root algorithm embodiment represent almost a 30% improvement in cycles per value. For electronic signal processing systems that are dominated with magnitude or square root computations, this is a significant improvement.

Benefits of disclosed recursive algorithms and devices implementing such recursive algorithms include improved performance over existing approximation methods for computing mathematical functions, including a reduced number of multiplications for a Taylor series approximation for functions including square root and magnitude functions with the same number of terms and thus the same numerical accuracy as alternative numerical algorithms. Disclosed embodiments also provide an improved table design that requires less computation cycles to load the coefficients and compute the effective table values. Fewer computation cycles corresponds to improved PPA over existing methods. Disclosed embodiments are applicable to both fixed point and floating point architectures. Moreover, although generally described as being realized using a DSP, disclosed embodiments can also be used to enable efficient FPGA and ASIC designs where multipliers are used for the computations.

Exemplary applications for disclosed embodiments include electronic signal processing systems including communication systems, imaging systems including medical imaging (e.g., ultrasound) systems, control systems, Global Positioning Systems (GPSs), satellite systems, tracking systems and other systems involving square root and magnitude computations.

Those skilled in the art to which this disclosure relates will appreciate that many other embodiments and variations of embodiments are possible within the scope of the claimed invention, and further additions, deletions, substitutions and modifications may be made to the described embodiments without departing from the scope of this disclosure.

I claim:

1. A recursive method for computing numerical values for mathematical functions, comprising:
   providing a recursive Taylor series representation of a mathematical function f(x) of a variable x around a given operating point a, wherein said recursive Taylor series representation includes a plurality of derivative derived terms that include ratios of derivatives of said mathematical function evaluated at said operating point a;
   determining coefficient data comprising ones of said plurality of derivative derived terms evaluated at said operating point a over a predetermined range, wherein said plurality of derivative derived terms are stored in a tangible memory device, and
   computing an approximation for said mathematical function f(x) using said recursive Taylor series representation evaluated with said coefficient data, wherein said computing is implemented with a computational architecture that includes a plurality of multipliers.

2. The method of claim 1, wherein said plurality of derivative derived terms are stored as a look-up table in said tangible memory device.

3. The method of claim 2, further comprising partitioning an argument of said plurality of derivative derived terms comprising said operating point a into at least a lower bit portion and a higher bit portion $x_H$, so that said $a = x_H \cdot 2^{2L}$, wherein said lower bit portions $2^{2L}$ have an even number of bits, and wherein said plurality of derivative derived terms are stored in said look-up table in said tangible memory device with only said higher bit portions $x_H$, and wherein said L is a known integer value.

4. The method of claim 3, wherein table values in said look-up table are for said mathematical function f(x) being a square root function ($x^{1/2}$) or $x = y_r^2 + y_i^2$ where y is a complex data value, and wherein said look-up table stores said plurality of derivative derived terms as $a^{1/2}$ and $a^{-1/2}$ values that contain values that only represent $\sqrt{x_H}$ and $1/\sqrt{x_H}$.

5. The method of claim 1, wherein said computational architecture that includes said plurality of multipliers comprises a digital signal processor.

6. The method of claim 1, wherein said recursive Taylor series for said mathematical function f(x) is derived from a function in the following form:
where $f(x) \approx d_{N-1}(1+d_{N-2}(1+d_{N-3}(1+d_{N-4}(1+\ldots+d_1(1+d_0)))))$ $$d_i = \begin{cases} \frac{1}{N-i-1}\left(\frac{f^{(N-i-1)}(a)}{f^{(N-i-2)}(a)}\right)(x-a) & \text{for } 0 \le i \le N-2 \\ f(a) & \text{for } i = N-1 \end{cases}$$

where $f^{(i)}(a)$ terms represent derivates of f with respect to x evaluated at said operating point a.

7. A digital signal processor (DSP) IC for computing numerical values for mathematical functions, comprising:
a substrate having a semiconductor surface;
a memory device including a stored recursive Taylor series representation for a mathematical function f(x) of a variable x around a given operating point a that includes a plurality of derivative derived terms that include ratios of derivatives of said mathematical function evaluated at said operating point a;
a multiply-accumulate (MAC) unit comprising a plurality of multipliers formed on said semiconductor surface coupled to said memory that is operable to (i) determine coefficient data comprising ones of said plurality of derivative derived terms evaluated at said operating point a over a predetermined range, and to (ii) compute an approximation for said mathematical function f(x) using said recursive Taylor series representation evaluated with said coefficient data.

8. The DSP IC of claim 7, wherein said memory device comprises non-volatile memory.

9. The DSP IC of claim 8, wherein arguments of said plurality of derivative derived terms comprising said operating point a are partitioned into at least a lower bit portion and a higher bit portion $x_H$, so that said $a = X_H \cdot 2^{2L}$, wherein said lower bit portions $2^{2L}$ have an even number of bits, and wherein said plurality of derivative derived terms are stored in a look-up table in said memory device with only said higher bit portions $x_H$.

10. The DSP IC of claim 9, wherein table values in said look-up table are for said mathematical function f(x) being a square root function ($x^{1/2}$) or $x = y_r^2 + y_i^2$ where y is a complex data value, and wherein said look-up table stores said plurality of derivative derived terms as $a^{1/2}$ and $a^{-1/2}$ values that contain values that only represent $\sqrt{X_H}$ and $1/\sqrt{x_H}$.

11. The DSP IC of claim 7, wherein said DSP includes a plurality of separate redundant data paths for computing said approximation for said mathematical function f(x).

* * * * *